(12) United States Patent
Prokhorov et al.

(10) Patent No.: US 8,768,564 B2
(45) Date of Patent: Jul. 1, 2014

(54) SYSTEM AND METHOD FOR VERIFICATION OF DRIVER PEDAL ACTIONS

(75) Inventors: Danil V. Prokhorov, Canton, MI (US); Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 523 days.

(21) Appl. No.: 13/149,301

(22) Filed: May 31, 2011

(65) Prior Publication Data

US 2012/0310472 A1 Dec. 6, 2012

(51) Int. Cl.
| | | |
|---|---|---|
| G01M 17/00 | (2006.01) | |
| G06F 7/00 | (2006.01) | |
| G06F 19/00 | (2011.01) | |
| G06G 7/70 | (2006.01) | |
| B60Q 1/00 | (2006.01) | |

(52) U.S. Cl.
USPC ............ 701/32.2; 701/33.7; 701/70; 340/453

(58) Field of Classification Search
USPC ................................................ 701/32.2, 33.7
See application file for complete search history.

(56) References Cited

U.S. PATENT DOCUMENTS

| | | | |
|---|---|---|---|
| 5,416,703 A | 5/1995 | Gruler et al. | |
| 6,431,872 B1 | 8/2002 | Shiraishi et al. | |
| 6,438,491 B1 | 8/2002 | Farmer | |
| 7,584,034 B2 * | 9/2009 | Kosugi | 701/32.4 |
| 7,862,177 B2 | 1/2011 | Kubota et al. | |
| 2008/0174415 A1 | 7/2008 | Tanida et al. | |
| 2008/0258885 A1 | 10/2008 | Akhan | |
| 2009/0138155 A1 | 5/2009 | Wakiyama et al. | |
| 2009/0265069 A1 * | 10/2009 | Desbrunes | 701/70 |
| 2011/0112719 A1 * | 5/2011 | Marumoto et al. | 701/35 |
| 2011/0281686 A1 * | 11/2011 | Desbrunes | 477/185 |

OTHER PUBLICATIONS

Joel C. McCall et al. "Driver Behavior and Situation Aware Brake Assistance for Intelligent Vehicles"; Proceedings of the IEEE; vol. 95; No. 2; Feb. 2007; pp. 374-387.

* cited by examiner

*Primary Examiner* — Muhammad Shafi
*Assistant Examiner* — Majdi Alsomiri
(74) *Attorney, Agent, or Firm* — Oblon, Spivak, McClelland, Maier & Neustadt, L.L.P.

(57) ABSTRACT

A device and a corresponding method including a vehicle data recording section having a plurality of vehicle operating characteristic sensors, a main system controller, and an event data recorder subservient to the main system controller. Also included in the device is a driver action recording section including at least one driver action sensor, a driver action system controller not subservient to the main system controller, and a driver action recorder. The at least one driver action sensor obtains information regarding actions of a driver of the vehicle concurrently with at least one of the plurality of vehicle operating characteristic sensors such that sensor data corresponding to an event is obtained independently by each of the vehicle data recording section and the driver action recording section.

21 Claims, 9 Drawing Sheets

SYSTEM AND METHOD FOR VERIFICATION OF DRIVER PEDAL ACTIONS

BACKGROUND

1. Field of the Disclosure

The present disclosure relates to a system and method for verifying pedal actions in an automobile.

2. Description of the Related Art

In the past, information regarding whether an accelerator pedal was pressed was gathered from the event data recorder. However the event data recorder is subservient to the main system controller and thus if an error were to occur in the main system controller it would be difficult or impossible to ascertain whether the data obtained and stored in the event data recorder is entirely accurate.

SUMMARY

Accordingly, the present disclosure describes, inter alia, a device that includes a system including a vehicle data recording section and a driver action recording section. The vehicle data recording section includes a plurality of vehicle operating characteristic sensors that obtain information regarding operation of a vehicle, a main system controller that controls operation of the vehicle, and an event data recorder subservient to the main system controller that records data obtained by the plurality of vehicle operating characteristic sensors. The driver action recording section includes at least one driver action sensor that obtains information regarding actions of a driver of the vehicle, a driver action system controller not subservient to the main system controller that controls operation of the driver action recording section, and a driver action recorder that records data obtained by the at least one driver action sensor. The at least one driver action sensor obtains information regarding actions of a driver of the vehicle concurrently with at least one of the plurality of vehicle operating characteristic sensors obtaining information of an operating characteristic such as for example, acceleration triggered by the actions of the driver of the vehicle such that sensor data corresponding to an event is obtained independently by each of the vehicle data recording section and the driver action recording section.

The present disclosure describes, inter alia, a method including several steps. The method includes the steps of obtaining information regarding operation of a vehicle via a plurality of vehicle operating characteristic sensors, controlling operation of the vehicle using a main system controller, and recording data obtained by the plurality of vehicle operating characteristic sensors using an event data recorder subservient to the main system controller. Also included in the method are the steps of obtaining information regarding actions of a driver of the vehicle via at least one driver action sensor, the at least one driver action sensor obtaining information regarding actions of a driver of the vehicle concurrently with at least one of the plurality of vehicle operating characteristic sensors obtaining information of an operating characteristic triggered by the actions of the driver of the vehicle, recording data obtained by the at least one driver action sensor using a driver action recorder such that sensor data corresponding to an event is obtained independently by each of the event data recorder and the driver action recorder, and controlling operation of the driver action recorder using a driver action system controller not subservient to the main system controller.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
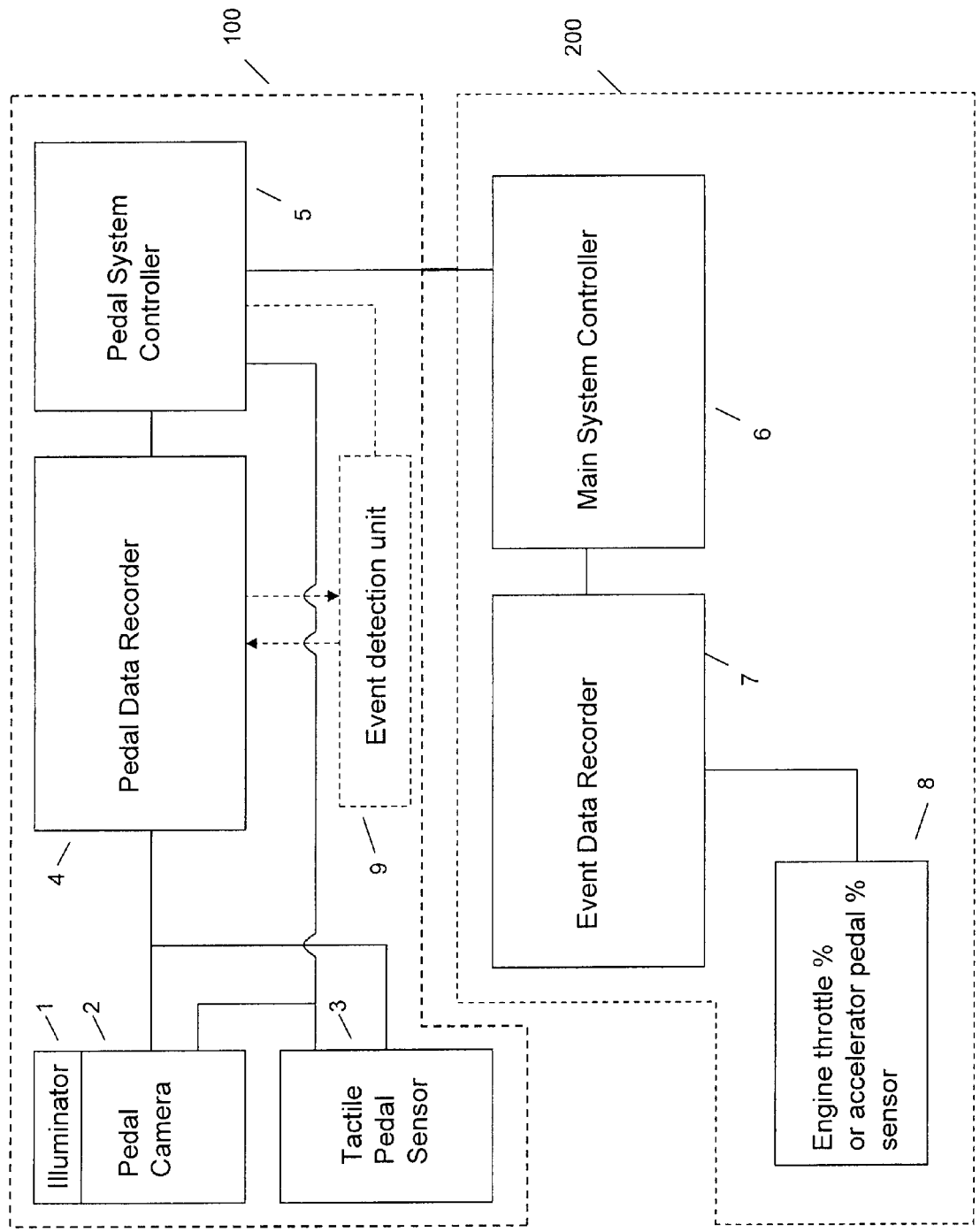
FIG. 1 illustrates a system diagram showing the pedal system section and the main system section.

Referring now to the drawings wherein like reference numbers designate identical or corresponding parts throughout the several views and more particularly to FIG. 1 thereof, there is illustrated a system diagram showing the relationship between the pedal system section 100 and the main system section 200.

FIG. 1 illustrates that the main system section 200 includes a main system controller 6, an event data recorder 7, and a number of sensors 8 including an engine throttle sensor and/or an accelerator pedal sensor. The main system controller 6 controls many aspects of an automobile (not shown) in which the controller 6 is installed. The event data recorder 7 is one of the modules which are subservient to the main system controller 6. The event data recorder 7 can be a tamper proof read/write memory device which records information from the sensors 8 and provides the information with time-stamps which indicate when the information was recorded. Exemplary requirements for an event data recorder can be found in The 2006 National Highway Traffic Safety Administration—Final rule. Docket no. NHTSA-2006-25666; 49 CFR Part 563 Event data recorders, Federal Register, vol. 71, no. 166, pp. 50998-51048, incorporated herein by reference.

The event data recorder 7, in addition to recording information about sideways acceleration, forward or rearward acceleration, engine speed, driver steering input, right front passenger safety belt status, engagement of electronic stability control system, antilock brake activity, side airbag deployment time for driver and right front passenger, and seat track positions for both the driver and right front passenger, the event data recorder 7 can record engine throttle percentage or accelerator pedal percentage.

As is noted above, the event data recorder 7 is subservient to the main system controller 6. In contrast, the pedal system section 100 is not subservient to the main system controller 6. Instead the pedal system controller 5 is connected to the main system section 200 so that the clocks of both the pedal system controller 5 and the main system controller 6 can be synchronized. The pedal system section 100 independently audits the accelerator pedal (and also the brake pedal) to determine the actions taken by the driver. This information is recorded and independently stored and provides a redundant and more detailed record of the actions taken by the driver.

The pedal system section 100 includes the pedal system controller 5 and the pedal data recorder 4. Also included in the pedal system section 100 are a pedal camera 2 and illuminator 1 and/or a tactile pedal sensor 3.

The details of the pedal camera 2 and illuminator 1 will be discussed with regard to FIGS. 2(a), 2(b) and 3 below.

Figure 2A:
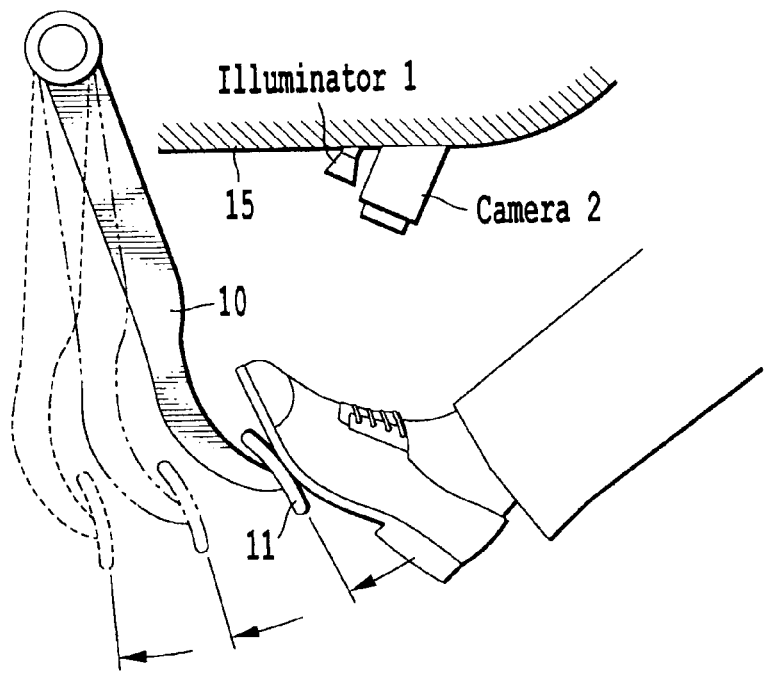
FIGS. 2(a) and 2(b) illustrate pedal camera and illuminator positioning.

FIG. 2(a) illustrates a video camera 2 and a light source 1 that are positioned above the pedals. As can be seen in FIG. 2(a), the camera 2 protrudes from the under section 15 and is angled such that the camera is not obstructed by the foot/leg of the driver and is able to capture different foot positions which occur during acceleration (or braking). The illuminator 1 can also be embedded into the under section 15 and positioned so that proper illumination is provided to the camera 2.

Figure 2B:
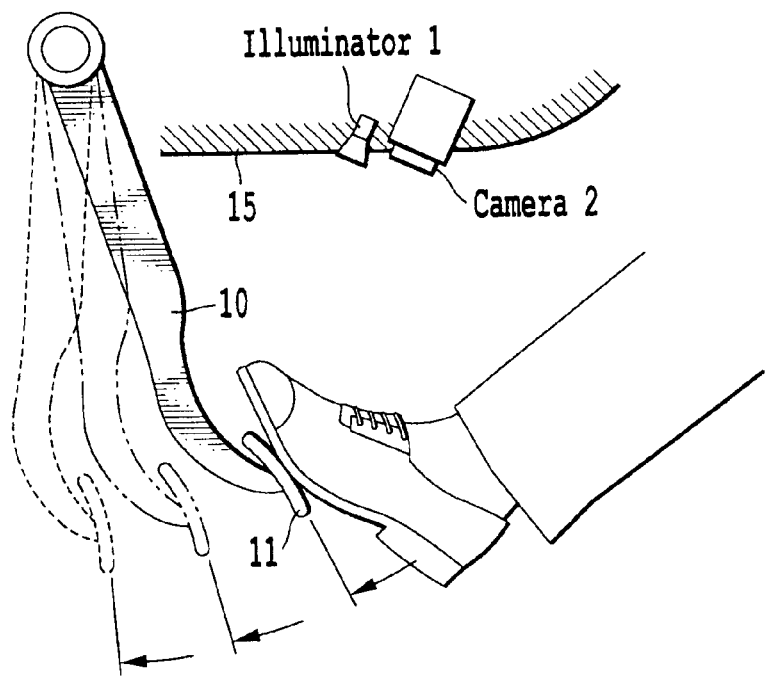

The positioning of the camera 2 and the illuminator 1, shown in FIGS. 2(a)-(b), provides the advantage that dirt e.g., from shoes, vehicle interior cleaning, etc., will likely not attach in front of the lens of the video camera 2 and thus negatively affect the operation. As a result of the positioning, camera 2/illuminator 1 cleaning/self-cleaning is not as often required. Of course, service technicians likely will be instructed to test the imaging system at the times of regular vehicle services to ensure that the camera's 2 lens is not obstructed.

In one embodiment, dim-light or eye-invisible-light illuminators 1 are used to ensure that the system operates inconspicuously, as some drivers likely would have issues with lighting at their feet, especially if the light source is too bright to be a distraction in low-light driving conditions.

FIG. 2(b) illustrates another embodiment in which the camera 2 is hidden inside the under section 15. In addition, the illuminator 1 is also disposed up inside the under section 15.

Although not shown in FIGS. 2(a) and 2(b), these embodiments can also include multiple cameras which capture the scene from multiple angles and illuminators positioned at multiple or different locations from the cameras.

Figure 3:
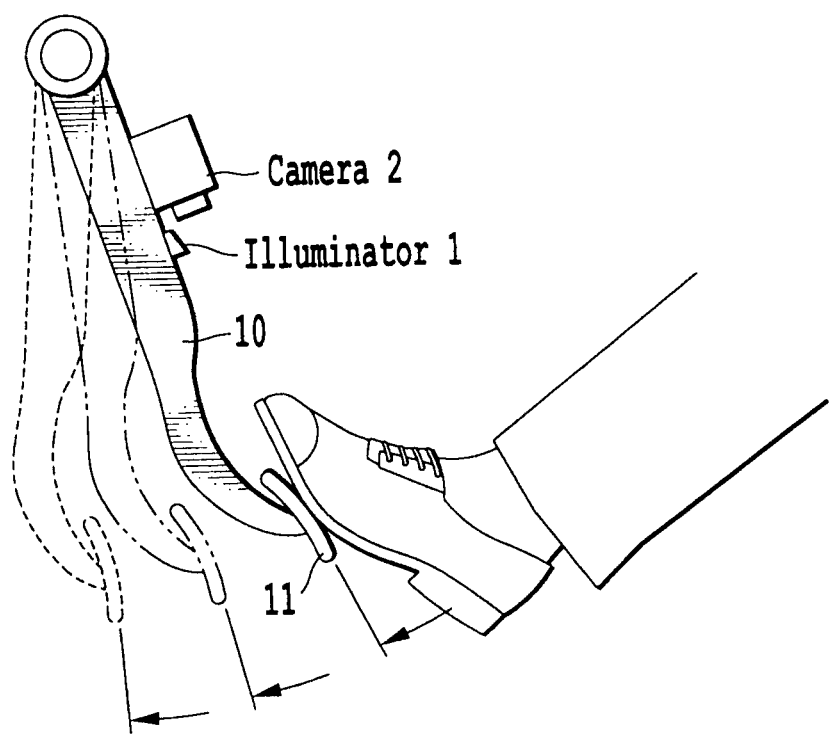
FIG. 3 illustrates another pedal camera and illuminator positioning.

FIG. 3 illustrates an embodiment in which the camera 2 and the illuminator 1 are attached to the arm of the accelerator pedal 10. The embodiment can also include a second camera attached to the brake pedal.

As is shown in FIG. 3, the camera 2 with the illuminator 1 can alternatively be positioned such that the imaging of only a small area of the interface between the pedal 11 and the foot takes place.

Such a positioning also has significant advantages. For example, the camera 2 moves with the pedal 11, therefore the camera 2 can focus on imaging an effectively stationary target. Taking images of a stationary target does not require as great an amount of illumination as is required for an adequate image of a moving target. Even though the embodiment shown in FIG. 3 operates under more difficult operating conditions (e.g., the system could be damaged by the driver's foot, or clogged by the dirt which may accumulate on the pedal and its vicinity over time), these operating conditions are compensated for by a self cleaning mechanism and periodic inspection.

The self cleaning mechanism can operate using a roll of transparent film which can be advanced by a small electric motor in front of the camera lens, similarly to a roll of film in a camera, so as to provide a cleaner view when necessary. When the vehicle is due for inspections, a technician can also inspect this device and possibly replace worn-out film.

In addition, the camera 2 shown in FIG. 3 can be placed in a special housing that protects the camera 2 from damage.

Figure 4:
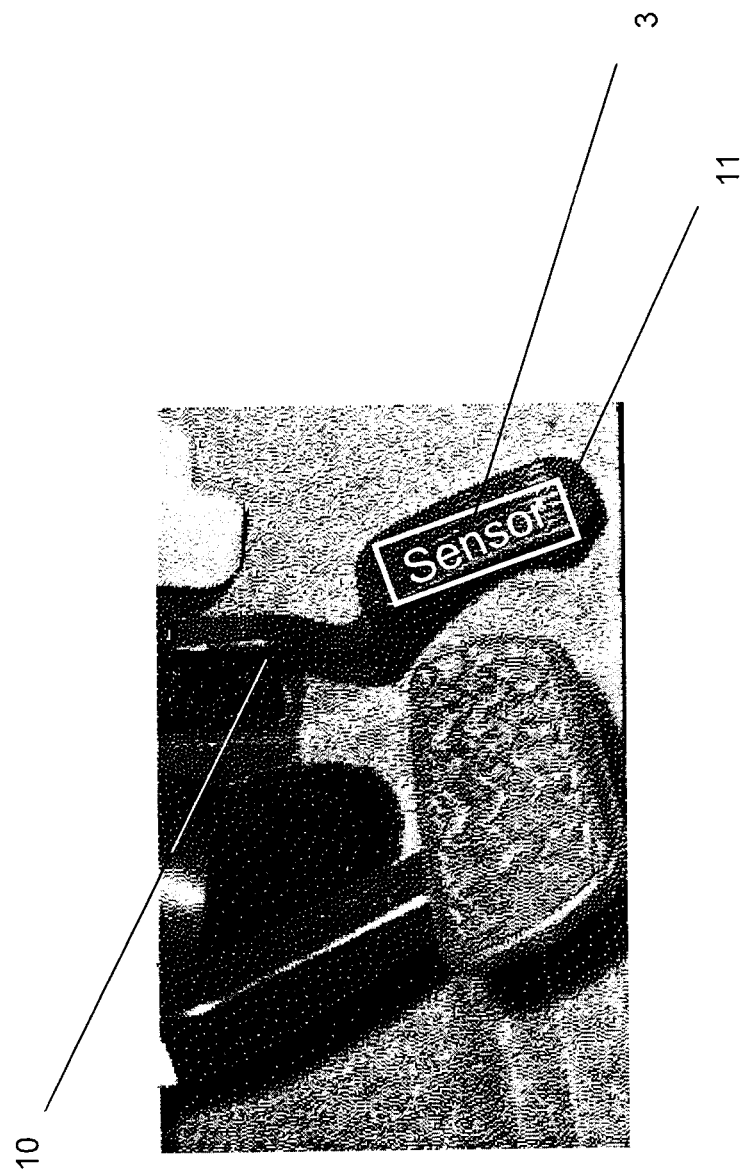
FIG. 4 illustrates an embodiment in which a tactile sensor is included in the pedals.

FIG. 4 illustrates more detail regarding the tactile pedal sensor 3 shown in FIG. 1. As is illustrated in FIG. 4, the tactile pedal sensor 3 can be embedded into the pedal 11. In addition, an additional tactical pedal sensor can be embedded into the brake pedal.

The tactile sensor 3 can be used for each pedal to confirm that the corresponding pedal has been pressed (and with what approximate force). As an example of such sensor, an optoelectronic design is provided. An example of such as sensor can be seen in G. De Maria, A. Minardo, C. Natale, S. Pirozzi, L. Zeni, Optoelectronic Tactile Sensor Based on Micromachined Scattering Wells, in Proc. First Mediterranean Photonics Conference, 25-28 Jun. 2008, Ischia, Napoli, Italy, incorporated herein by reference.

The tactile sensor 3 can be used alone as the primary sensor for obtaining information for the pedal system controller or can be used in concert with the pedal camera 2. Use of both sensors provides the advantage that, in case one of the sensors fails or is obstructed, the pedal data recorder will still be able to obtain data regarding the driver's actions.

Figure 5:
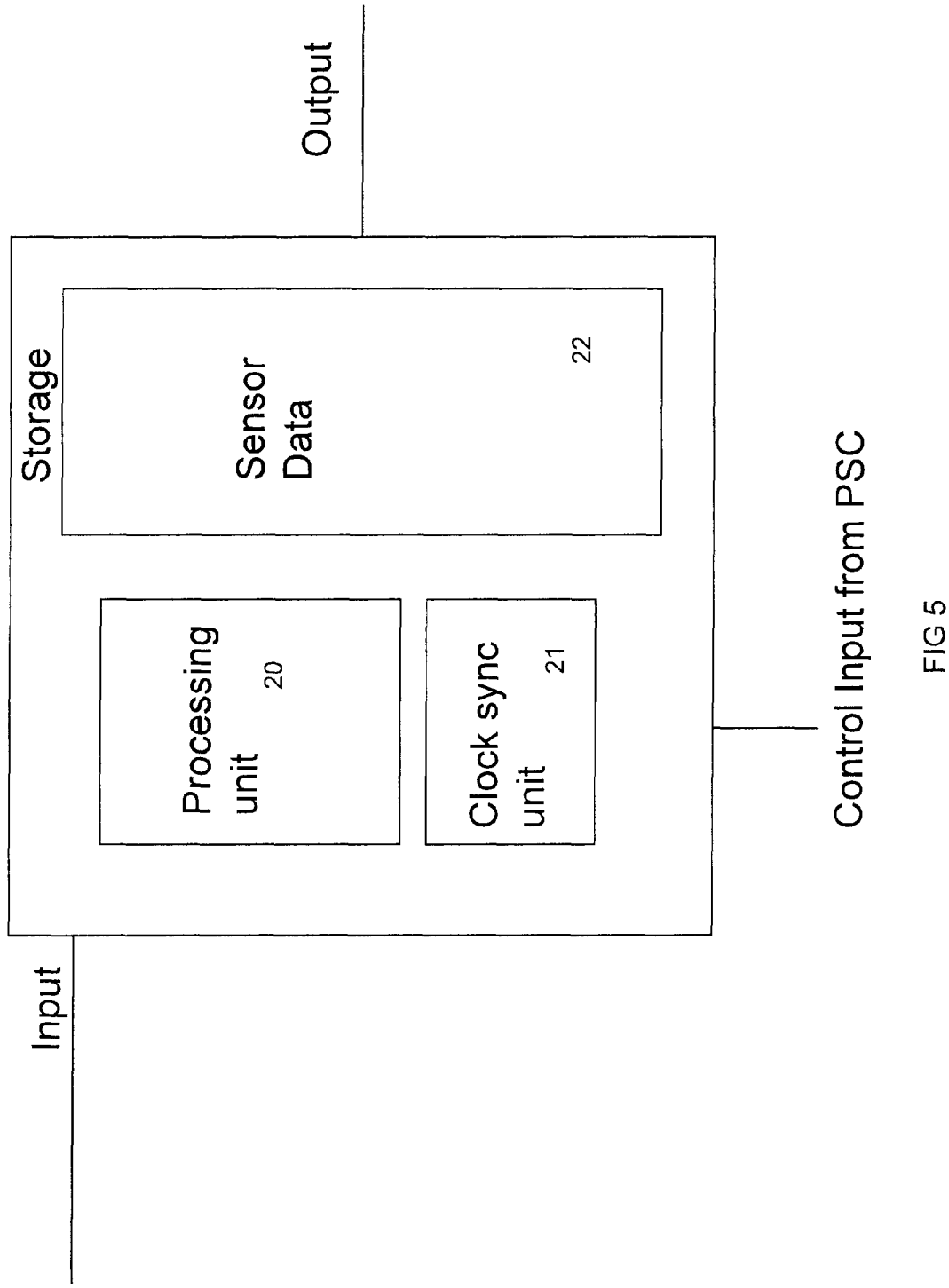
FIG. 5 illustrates a more detailed view of the pedal data recorder.

FIG. 5 provides detail regarding the pedal data recorder 4 shown in FIG. 1. The pedal data recorder 4 includes a processing unit 20, a clock synchronization unit 21, and a storage 22 which stores the sensor data along with a timestamp.

The processing unit 20 controls input of the sensor data received from the camera 2 and/or the tactile sensor 3. The processing unit 20 can perform encoding of the data from the camera 2 or the encoding of the camera 2 output can be performed locally at the camera 2. The processing unit 20 also formats the sensor data for storage in the storage unit 22. The processing unit 20 attaches to the sensor data timing information made possible by the clock synchronization unit 21 which receives a timing message from the pedal system controller 5.

The pedal data recorder 4 operates in the closed-circuit observation fashion (e.g., a 30-min loop). Alternatively, the system can operate such that a limited amount of information (such as a low resolution version) or time stamped event information is maintained for a longer period, leaving the high resolution video or sensor data to be replaced every thirty minutes.

Moreover, the pedal data recorder 4 can be configured to record for different amounts of time before the overwriting begins. Further, the system can be configured to begin and stop recording based on whether the engine is running or based on whether the car is receiving power or if the car is moving, etc.

In addition, overwriting of the sensor data can be ceased when an accident has occurred. The message that an accident has occurred is received by the pedal data recorder 4 which stops the looping process in response. The message that an accident has occurred is received from the pedal system controller 5.

The pedal data recorder 4 also has the ability to output the sensor data when a request for the data is received from the pedal system controller 5. This allows inspection of the data after an accident has occurred.

Figure 6:
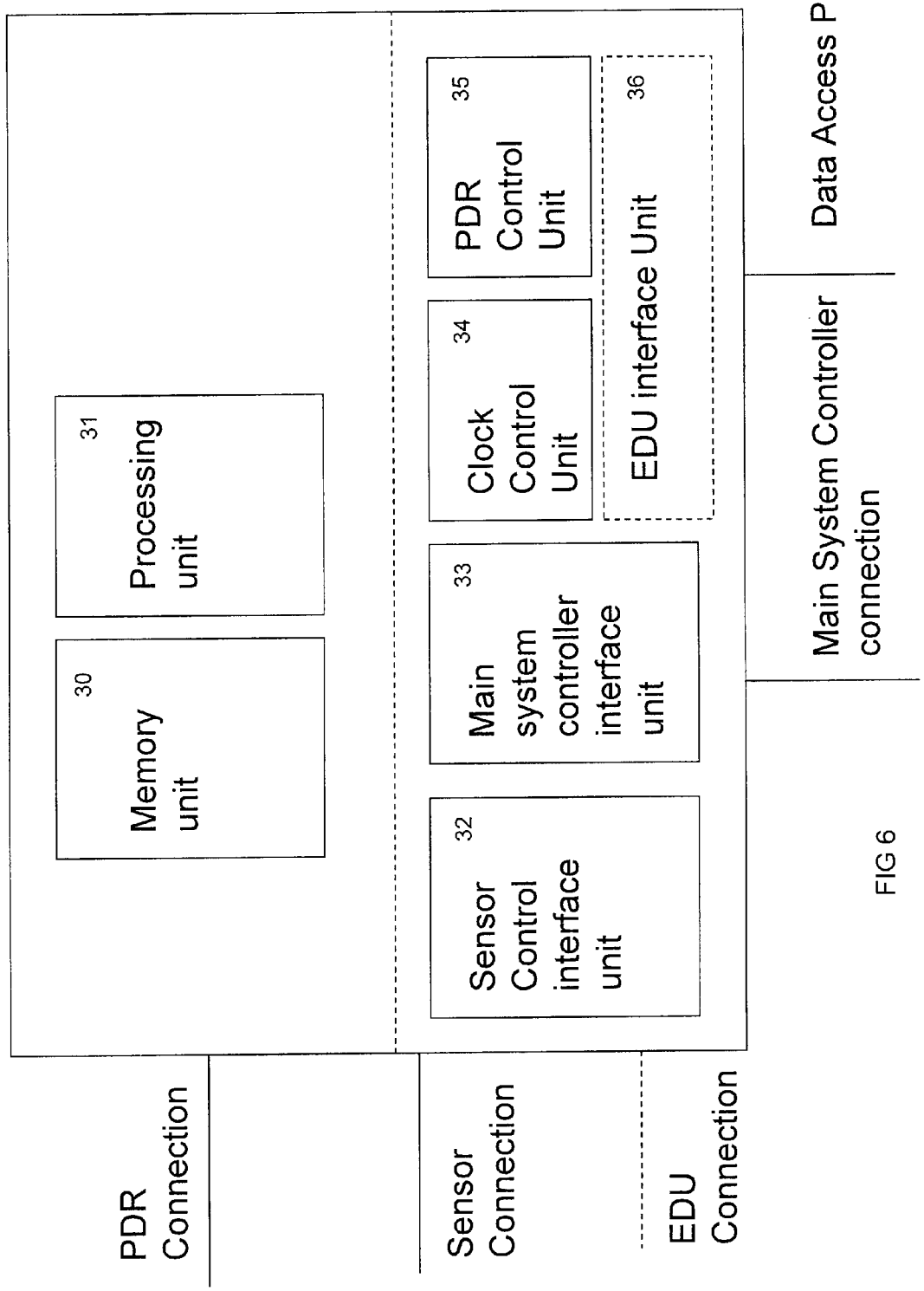
FIG. 6 illustrates a more detailed view of the pedal system controller.

FIG. 6 illustrates an example of the pedal system controller 5. The pedal system controller 5 includes a memory unit 30, a processing unit 31, a sensor control interface unit 32, a main system controller interface unit 33, and a clock control unit 34. The pedal system controller 5 also includes connections to the pedal data recorder, the sensors, the main system controller 6 and a data access port for data output.

The memory unit 30 stores programs and operating instructions for the pedal system controller 5. The processing unit 31 operates the pedal system controller 5 and enables implementation of the functions of the pedal system controller 5. The sensor control interface 32 connects the pedal system controller 5 to the camera 2/illuminator 1 and the tactile sensor 3. The pedal system controller 5 can gather information about the sensors perform periodic tests on the sensors, and gather real time information from the sensors if necessary.

The main system controller interface unit 33 controls the interface between the pedal system controller 5 and the main system controller 6. The pedal system controller 5 receives both timing information and accident information from the main system controller 6.

For example, if the airbag has been deployed, this information is transmitted from the main system controller 6 to the pedal system controller 5 which uses this information to stop overwrite of data recorded in the pedal data recorder. As a result, data used by investigative authorities can be preserved.

The pedal system controller 5 also receives timing information from the main system controller 6. This information is parsed by the main system controller interface unit 33 and passed to the clock control unit 34 which synchronizes the clock of the pedal system controller 5 and the clock of the pedal data recorder 34.

The pedal data recorder control unit 35 controls the interface with the pedal data recorder 4. The pedal system controller 5 instructs the pedal data recorder 4 to stop overwriting in response to receiving information regarding an accident and provides the pedal data recorder 4 with timing information so that the pedal data recorder 4 can be time synchronized with the pedal system controller 5. Moreover, the pedal system controller 5 instructs the pedal data recorder 4 to output stored data, receives the output stored data, and transfers this data to the data access port for output.

In another embodiment, the pedal system section 100 can include an event detection unit 9. In addition to maintaining records in the case of accident, the system can be configured to maintain records and cease the overwriting of particular data by the pedal data recorder 4 in the case of an event.

Figure 7:
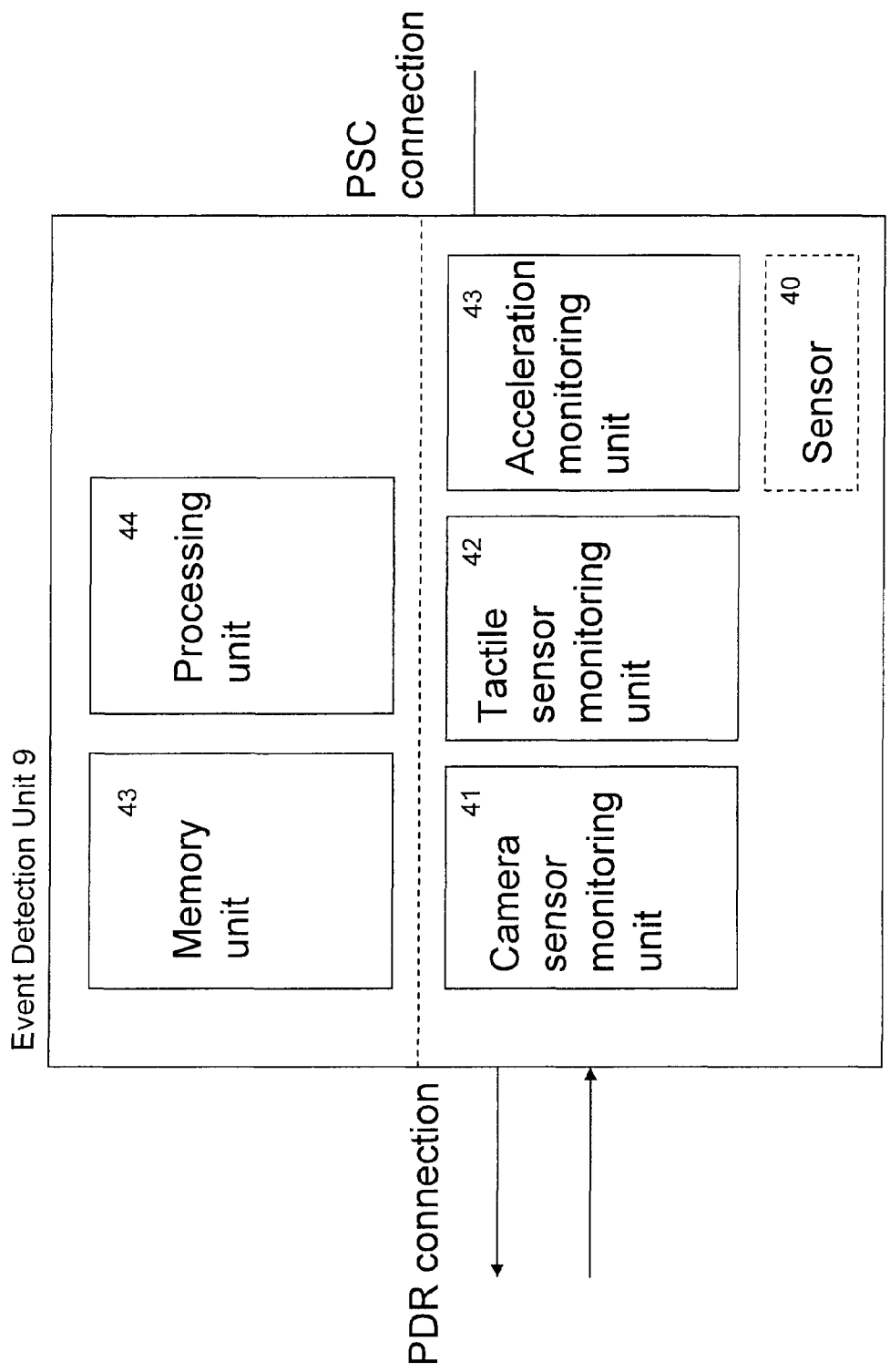
FIG. 7 illustrates a more detailed view of the event detection unit.

FIG. 7 illustrates the event detection unit 9 which includes a connection to the pedal data recorder 4 and the pedal system controller 5. Included in the event detection unit 9 are a memory unit 43, a processing unit 44, a camera sensor monitoring unit 41, a tactile sensor monitoring unit 42, and an acceleration monitoring unit 43. In another embodiment, a sensor 40, such as for example an accelerometer, is also included in the event detection unit 9.

The processing unit 44 and the memory unit 43 enable the operation of functions of the event detection unit 9. The camera sensor monitoring unit 41 can perform alone, or in concert with the tactile sensor monitoring unit 42 and/or the acceleration monitoring unit 43, monitoring of the feed output by the camera 2 sensor and stored by the pedal data recorder 4. This monitoring can include, for example, monitoring for excessively fast braking. The tactile sensor monitoring unit 42 can also perform alone, or in concert with the camera sensor monitoring unit 41 and/or the acceleration monitoring unit 43, monitoring of the tactile sensor data. For example, when the tactile sensor 3 is included in the brake pedal, the tactile sensor monitoring unit can monitor for multiple brake pushes, excessively fast braking, excessively hard braking, etc. The tactile sensor monitoring unit 42 can use a threshold algorithm which compares the values obtained by the tactile sensor 3 with average values or predetermined values which correspond to a normal speed or pressure of braking.

When used in concert with the acceleration monitoring unit 43, the tactile or camera sensor monitoring unit 41/42 can determine that the brake pedal is being pushed while the vehicle is continuing to accelerate, such as in the case where both the brake pedal and the accelerator pedal are being pushed concurrently.

The acceleration monitoring unit 43 performs monitoring of the acceleration and movement of the vehicle. Information regarding the acceleration can be obtained from an optional sensor 40 and/or from information such as throttle data, acceleration data, etc. received from the main system controller 6 via the pedal system controller 5.

In response to an event being identified by the event detection unit 9, a message is output to the pedal system controller 5 which stops the overwriting of the sensor data by the pedal data recorder 4. The stop of the overwriting can be temporary with the important information (e.g. the sensor information relating to the detected event) being maintained in a separate file/location from the information which continues to be overwritten by the overwriting loop.

When an accident or an event occurs, the pedal data recorder 4 can save the sensor data within a temporal window before and after the accident/event into a separate file. The pedal data recorder 4 can then continue recording information. Alternatively, in the case of an accident, the pedal data recorder can immediately stop overwriting and continue to maintain this posture indefinitely.

Figure 8:
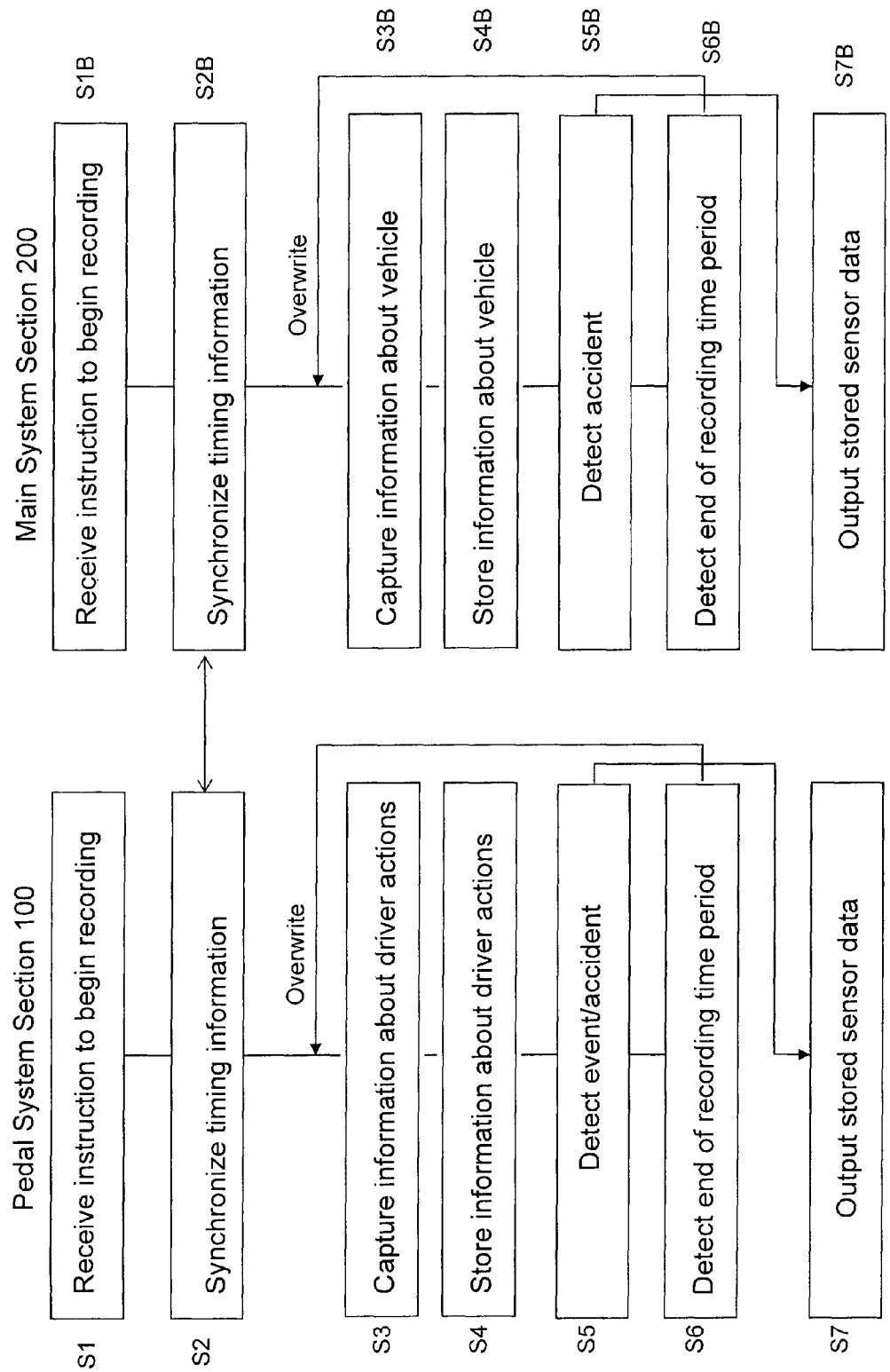
FIG. 8 shows a process diagram according to one embodiment.

FIG. 8 illustrates a process diagram of an embodiment. The flow diagram shown in FIG. 8 illustrates the concurrent processes taken by the pedal system section 100 and the main system section 200. The pedal system section 100 performs an independent data recording process which is time synchronized with the data recording process performed by the main system section 200.

In step S1, the pedal data recorder 4 of the pedal system section 100 receives an instruction to begin recording. This instruction can correlate with the engine starting, with the vehicle circuitry receiving power, or some other suitable prompt.

In step S2, the timing information for the system clock of the pedal system section 100 is synchronized with the system clock of the main system section 200. This synchronization enables the data recorded by the pedal system section 100 to be easily matched up with data of the main system section 200. The synchronization step S2 may be performed intermittently or each time the pedal system section 100 is powered up and begins recording.

Step S3 begins the process loop in which information about the driver's actions is captured by the sensors 2/3 and stored, in step S4, in the pedal data recorder 4. Unless an accident or an event is detected in step S5, in step S6, the end of recording period (for example 30 minutes for a half-hour loop) is detected and the process flow returns to S3 and overwrites the previously recorded sensor data.

When, in step S5, an event or accident is detected, the overwriting of the relevant data is stopped and the relevant sensor data is maintained either in a separate file with recording resuming or the recording is stopped (possibly after a predetermined period).

In step S7, the data which has been maintained in step S5 is made available to be output for review.

Concurrently with the process performed in the pedal system section 100, the main system section 200 performs process steps S1B-S7B.

In step S1B, the instruction for recording is received by the event data recorder 7 of the main system section 200. In step S2B, the timing information of the main system section 200 is passed to the pedal system section 100. In steps S3B-S6B the capture and recording of vehicle data is performed in a loop until an accident is detected in step SSB. In Step S7B the data recorded before, and possibly immediately after, the accident is made available for output.

Many of the elements of the embodiments include computer processors. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 9:
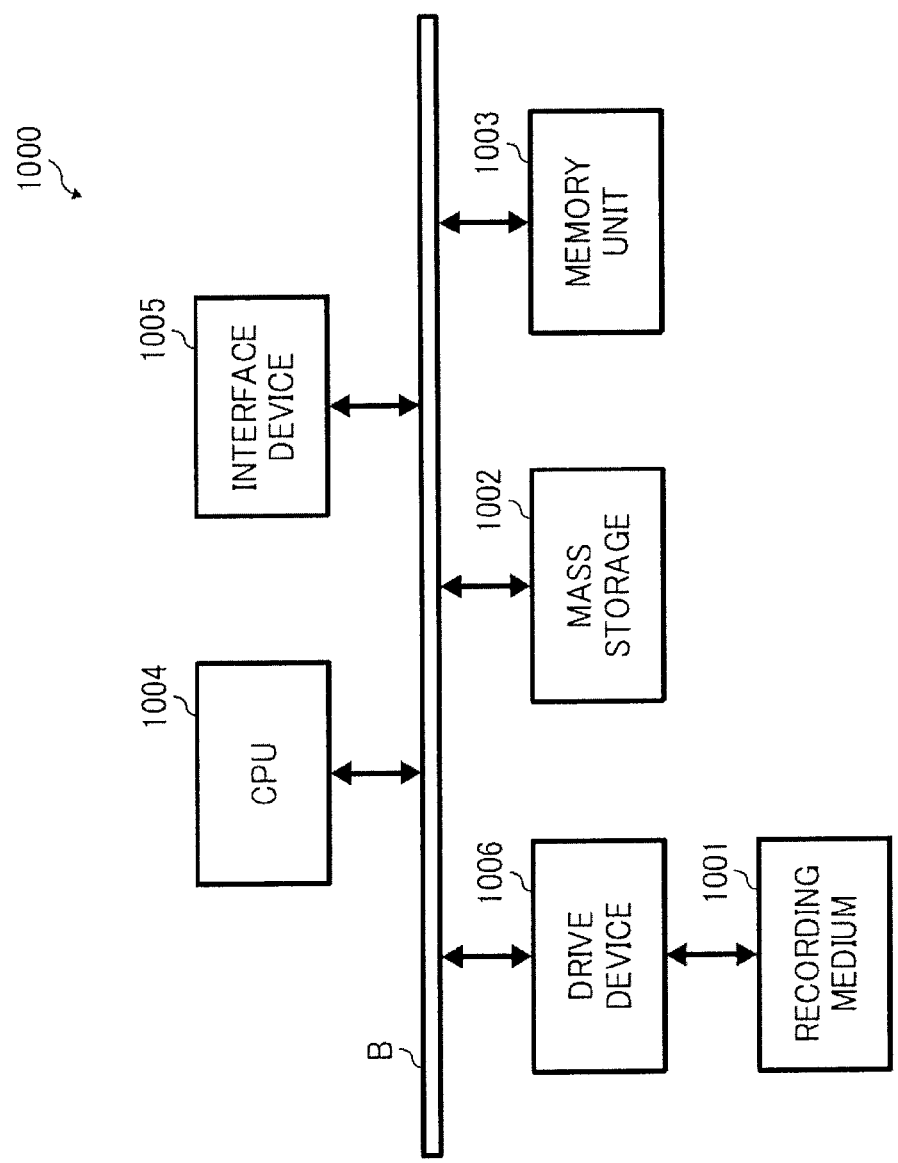
FIG. 9 illustrates a computer system according to one embodiment.

In addition, certain embodiments of the system can be implemented using a computer based system 1000 as shown in FIG. 9. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

As should be apparent, the disclosure can provide a number of advantageous features and benefits. It is to be understood that, in practicing the disclosure, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the disclosure that do not include each of the features of the disclosed examples.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system, comprising:
   a vehicle data recording section including:
      a plurality of vehicle operating characteristic sensors configured to obtain information regarding operation of a vehicle,
      a main system controller configured to control operation of the vehicle, and
      an event data recorder subservient to the main system controller and configured to record data obtained by the plurality of vehicle operating characteristic sensors; and
   a driver action recording section including:
      at least one driver action sensor configured to obtain information regarding actions of a driver of the vehicle,
      a driver action system controller not subservient to the main system controller and configured to control operation of the driver action recording section, and
      a driver action recorder configured to record data obtained by the at least one driver action sensor,
   wherein the at least one driver action sensor obtains information regarding actions of a driver of the vehicle concurrently with at least one of the plurality of vehicle operating characteristic sensors obtaining information of an operating characteristic triggered by the actions of the driver of the vehicle such that sensor data corresponding to an event is obtained independently by each of the vehicle data recording section and the driver action recording section.

2. The system according to claim 1, wherein the at least one driver action sensor is at least one of a camera/illuminator pair and a tactile sensor.

3. The system according to claim 2, wherein the at least one driver action sensor includes a plurality of tactile sensors.

4. The system according to claim 1, wherein the at least one driver action sensor includes at least one tactile sensor disposed in a brake pedal or an accelerator pedal.

5. The system according to claim 1, wherein the at least one driver action sensor includes a camera/illuminator pair attached to the arm of a brake pedal or accelerator pedal.

6. The system according to claim 1, wherein the at least one driver action sensor includes a camera/illuminator pair attached above a brake pedal or accelerator pedal to a housing of the vehicle.

7. The system according to claim 1, wherein the at least one driver action sensor includes a camera/illuminator pair attached above a brake pedal or accelerator pedal and hidden in a housing of the vehicle.

8. The system according to claim 1, wherein the driver action recorder is further configured to record data obtained by the at least one driver action sensor for a predetermined amount of time before overwriting the obtained data.

9. The system according to claim 8, wherein the overwriting of the obtained data is halted in response to an event.

10. The system according to claim 8, wherein the event is a vehicle accident.

11. A method, comprising:
    obtaining information regarding operation of a vehicle via a plurality of vehicle operating characteristic sensors;
    controlling operation of the vehicle using a main system controller;
    recording data obtained by the plurality of vehicle operating characteristic sensors using an event data recorder subservient to the main system controller;
    obtaining information regarding actions of a driver of the vehicle via at least one driver action sensor, the at least one driver action sensor obtaining information regarding actions of a driver of the vehicle concurrently with at least one of the plurality of vehicle operating characteristic sensors obtaining information of an operating characteristic triggered by the actions of the driver of the vehicle;

recording data obtained by the at least one driver action sensor using a driver action recorder such that sensor data corresponding to an event is obtained independently by each of the event data recorder and the driver action recorder; and controlling operation of the driver action recorder using a driver action system controller not subservient to the main system controller.

12. The method according to claim 11, wherein the at least one driver action sensor is at least one of a camera/illuminator pair and a tactile sensor.

13. The method according to claim 12, wherein the at least one driver action sensor includes a plurality of tactile sensors.

14. The method according to claim 11, wherein the at least one driver action sensor includes at least one tactile sensor disposed in a brake pedal or an accelerator pedal.

15. The method according to claim 11, wherein the at least one driver action sensor includes a camera/illuminator pair attached to the arm of a brake pedal or accelerator pedal.

16. The method according to claim 11, wherein the at least one driver action sensor includes a camera/illuminator pair attached above a brake pedal or accelerator pedal to a housing of the vehicle.

17. The method according to claim 11, wherein the at least one driver action sensor includes a camera/illuminator pair attached above a brake pedal or accelerator pedal and hidden in a housing of the vehicle.

18. The method according to claim 11, further comprising:
recording data obtained by the at least one driver action sensor for a predetermined amount of time before overwriting the obtained data using the driver action recorder.

19. The method according to claim 18, wherein the overwriting of the obtained data is halted in response to an event.

20. The method according to claim 18, wherein the event is a vehicle accident.

21. A non-transitory computer readable storage medium having stored thereon a program that when executed by a computer causes the computer to execute a method comprising:

obtaining information regarding operation of a vehicle via a plurality of vehicle operating characteristic sensors;

controlling operation of the vehicle using a main system controller;

recording data obtained by the plurality of vehicle operating characteristic sensors using an event data recorder subservient to the main system controller;

obtaining information regarding actions of a driver of the vehicle via at least one driver action sensor, the at least one driver action sensor obtaining information regarding actions of a driver of the vehicle concurrently with at least one of the plurality of vehicle operating characteristic sensors obtaining information of an operating characteristic triggered by the actions of the driver of the vehicle;

recording data obtained by the at least one driver action sensor using a driver action recorder such that sensor data corresponding to an event is obtained independently by each of the event data recorder and the driver action recorder; and controlling operation of the driver action recorder using a driver action system controller not subservient to the main system controller.

* * * * *